UNITED STATES PATENT OFFICE.

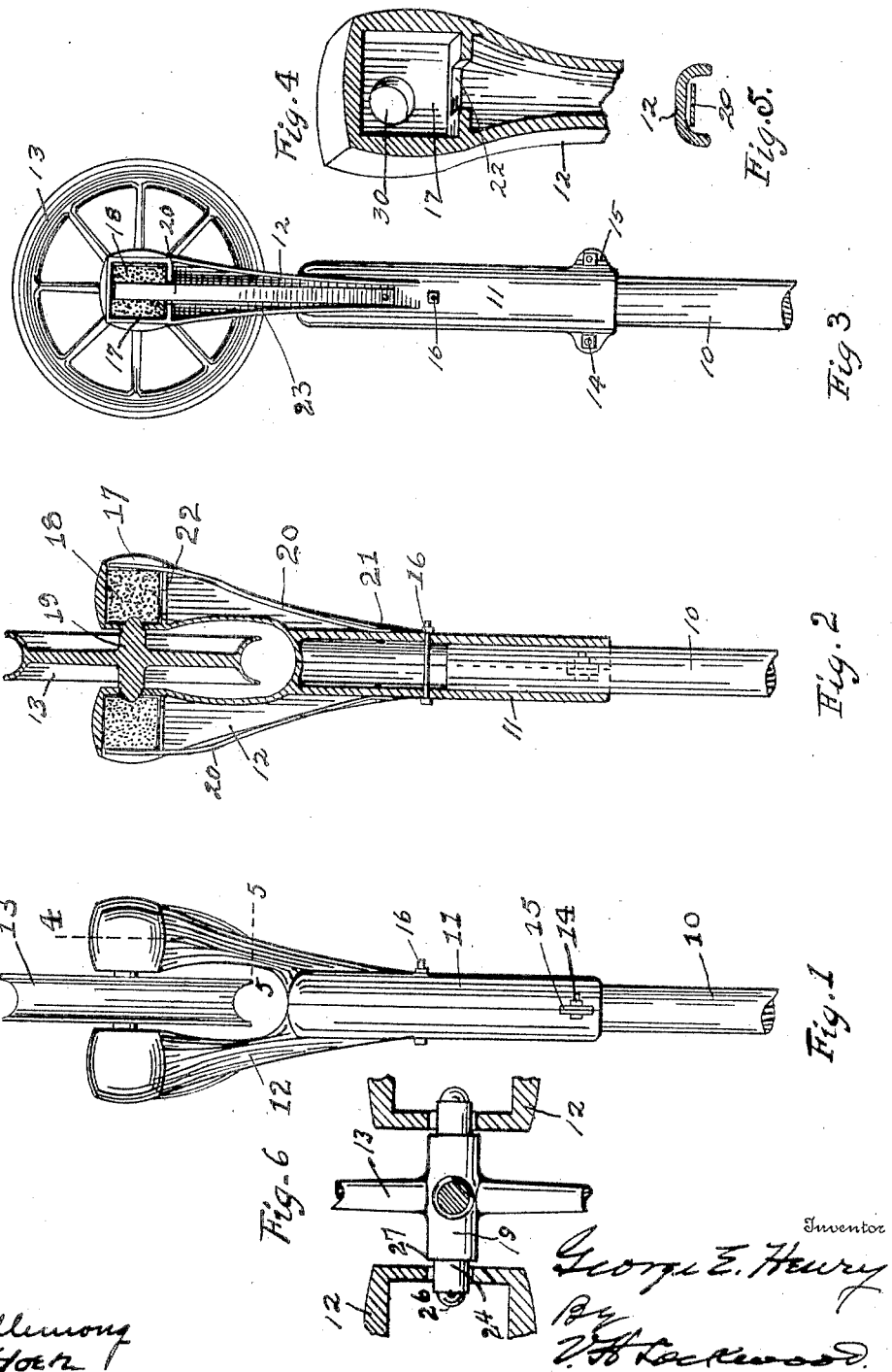

GEORGE E. HENRY, OF VINCENNES, INDIANA.

TROLLEY-MOUNTING.

No. 797,355.        Specification of Letters Patent.        Patented Aug. 15, 1905.

Application filed November 9, 1904. Serial No. 232,043.

*To all whom it may concern:*

Be it known that I, GEORGE E. HENRY, of Vincennes, county of Knox, and State of Indiana, have invented a certain new and useful Trolley-Mounting; and I do hereby declare that the following is a full, clear, and exact description thereof, reference being had to the accompanying drawings, in which like numerals refer to like parts.

The object of this invention is to mount a trolley for electric cars or other purpose so as to greatly prolong the life of the trolley and avoid the necessity of constantly replacing the trolley, as is the case with the ordinary trolley that is mounted on a stationary axle or pin. Furthermore, a mounting is desirable which will not interfere with the transmission of the electric current from the trolley-wire through the trolley-harp and trolley-rod to the car, especially after the mounting of the trolley has become worn, as is the case with ordinary trolleys mounted on a stationary pin or axle, for the axle or pin soon becomes worn and the interior of the hub of the trolley likewise worn, so that there is no good electrical contact between the two, especially as the trolley wabbles greatly when the car is rapidly moving.

Another feature consists in so mounting the trolley that its bearing will need no lubrication and will not wear rapidly, as is the case with the present trolley-mounting, where it is impractical to keep the parts lubricated.

The foregoing object and features, as well as the entire nature of my invention, will be understood from the accompanying drawings and the following description and claims.

In the drawings, Figure 1 is a front elevation of the trolley and its mounting, the trolley-rod being broken away. Fig. 2 is a central vertical section of what is shown in Fig. 1. Fig. 3 is a side elevation of what is shown in Fig. 1. Fig. 4 is a section on the line 4 of Fig. 1. Fig. 5 is a section on the line 5 5 of Fig. 1. Fig. 6 is a detail of the spindle and mounting on a large scale.

There is shown in the drawings a trolley-pole 10 of the usual sort, and instead of having a solid harp secured on the upper end thereof I provide a harp made in two similar parts, each consisting of a shank 11 and an upper part 12 for holding the bearings for the trolley 13. The two similar parts of the harp are placed with the shanks surrounding the upper end of the trolley-pole and clamped thereon by the bolt 14 through the ears 15 and also clamped together and on said pole by the bolt 16 above. The upper parts 12 of the harp have rectangular chambers 17, in each of which a block of graphite 18 is placed, and a spindle 19 of the trolley extends through suitable round openings 30 in the opposing faces of the upper parts of the harp into the graphite. The two blocks of graphite are forced toward each other and the spindle of the trolley by springs 20, secured to the shank of the harp by rivets 21, and with the upper ends of the springs bearing loosely against the block of graphite, so as to constantly force and feed the same inward as it wears away. The lower part of the chamber 17 has a slot 22 in it, through which the spring 20 moves as the graphite is worn away. The upper part of the harp is provided on each side with a vertical groove or recess 23, in which the spring lies, as seen in Fig. 3, especially after it is moved inward more than is shown in Fig. 2.

The spindle is cast integral with the trolley, so as to have a hub-like shoulder 24, the purpose of which is to engage the inner sides or faces of the parts of the harp and prevent the trolley from having so much lateral movement as to escape from its place. The spindle is turned down at its ends to fit in the holes in the opposing faces of the parts of the harp, loosely, however, as the bearing of the trolley is not in said hole or the opposing faces of the parts of the harp, but in the graphite blocks. The extreme ends 26 of the springs are semicircular to fit in similar recesses in the graphite blocks. With this construction the spindle of the trolley is mounted and has bearing in the graphite blocks only, and the function of the adjacent faces of the upper parts of the harp is to hold the graphite blocks in place and also prevent too much lateral movement of the trolley and its escape.

In assembling the device the spindle of the trolley must be mounted in its bearing before the harp is clamped on the trolley-rod and while the upper parts of the harp are separated somewhat. When they are clamped tightly together, the upper parts of the harp are so close together that the trolley cannot escape.

From the above description it is seen that the trolley-mounting affords a perfect conductor at all times, whether the device be worn or not, from the trolley-wire above to the trolley below and car. This results from the fact that the spindle of the trolley is rigidly connected or integral with the trolley and the springs hold the bearing-blocks always hard against the ends of the spindle and there is close connection between the springs and the bearing-blocks as well as between the bearing-blocks and the harp. Hence there is no break or chance of a break of the circuit. Where the trolley is on an independent spindle, the spindle becomes worn and the trolley runs on it, so that there is a very imperfect electrical connection between the two. It is one object of this invention to overcome that difficulty.

What I claim as my invention, and desire to secure by Letters Patent, is—

1. The combination of a trolley having a spindle rigidly connected therewith, a harp in which said trolley is mounted, bearings in the harp for the ends of said spindle and springs that press said bearings laterally against the ends of said spindle.

2. The combination of a harp having a pair of upwardly-extending oppositely-located parts, movable bearing-blocks mounted in the opposing parts of said harp, a trolley with a spindle rigidly connected therewith mounted between the parts of the harp with the ends of the spindle bearing in said bearing-blocks, and springs for forcing said bearing-blocks toward the spindle of the trolley.

3. The combination of a harp having a pair of oppositely-located chambers in the upper end thereof, movable bearing-blocks in said chambers, a trolley with a spindle rigidly connected therewith mounted between the parts of the harp with the ends of the spindle bearing in said bearing-blocks, and springs for forcing said bearing-blocks toward the spindle of the trolley.

4. The combination of a harp having a pair of oppositely-located chambers in the upper end thereof, the bottom of said chambers and the parts of the harp being recessed substantially as shown, movable bearing-blocks in said chambers, a trolley with a spindle rigidly connected therewith mounted between the parts of the harp with the ends of the spindle bearing in said bearing-blocks, and flat springs secured to the harp and resting in said recesses and bearing against said bearing-blocks so as to force them toward the spindle of the trolley.

5. The combination of a harp having a pair of oppositely-located chambers, the inner walls of said chambers being each provided with a hole, a trolley with a spindle rigidly connected therewith that at each end fits loosely in said holes, means on said spindle for engaging the opposing faces of the harp to limit the lateral play of the spindle of the trolley and prevent its escape, bearing-blocks in said chambers of the harp in which the ends of the spindle have bearing, and springs for forcing the blocks toward each other.

In witness whereof I have hereunto affixed my signature in the presence of the witnesses herein named.

GEORGE E. HENRY.

Witnesses:
F. P. ANDERSON,
M. T. JOHNSON.